Feb. 5, 1935.  R. P. LANSING  1,990,037
AUTOMATIC TRANSMISSION
Filed Feb. 16, 1932
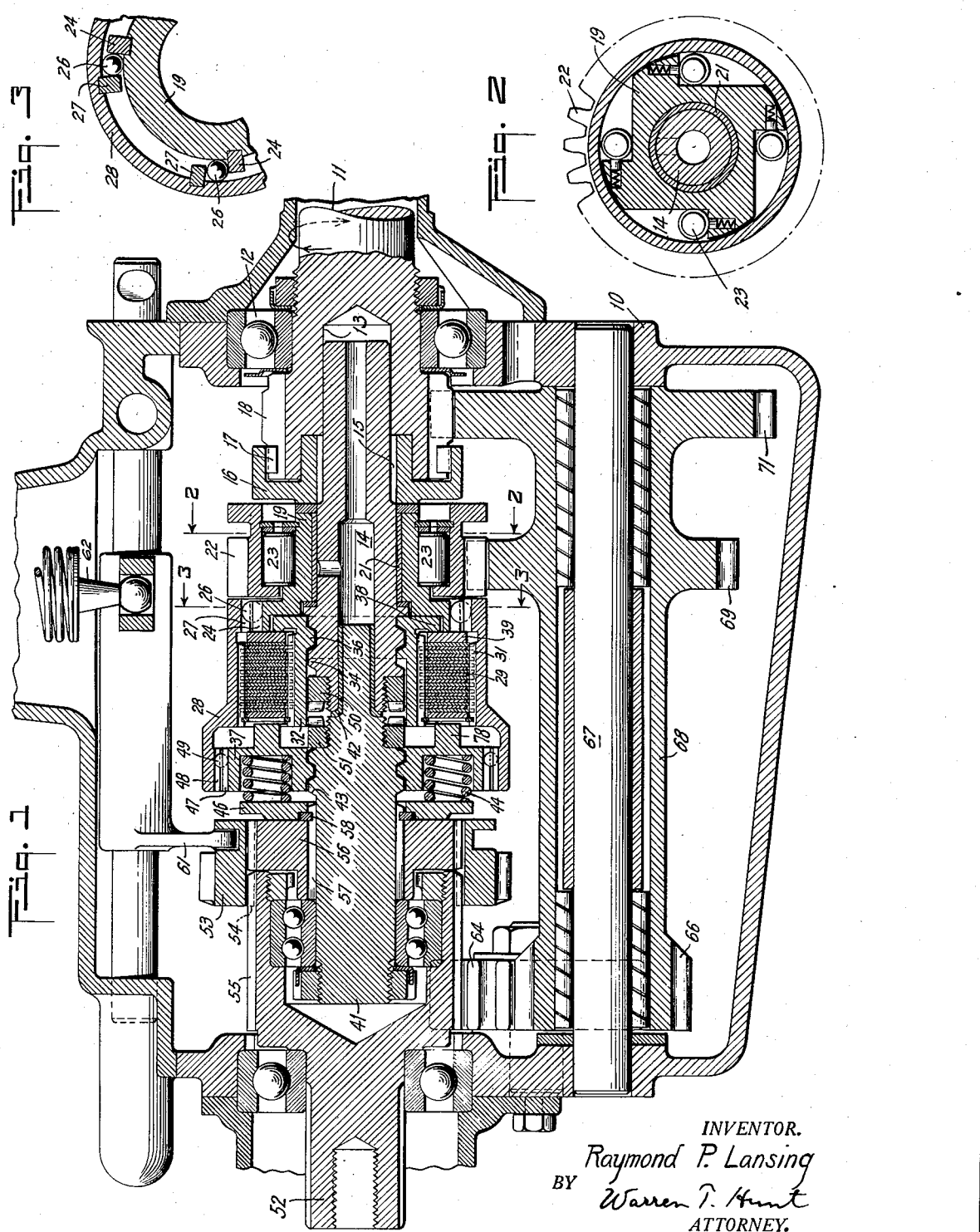
INVENTOR.
Raymond P. Lansing
BY
Warren T. Hunt
ATTORNEY.

Patented Feb. 5, 1935

1,990,037

UNITED STATES PATENT OFFICE 1,990,037

AUTOMATIC TRANSMISSION

Raymond P. Lansing, Montclair, N. J., assignor, by mesne assignments, to Eclipse Aviation Corporation, East Orange, N. J., a corporation of New Jersey Application February 16, 1932, Serial No. 593,353

17 Claims. (Cl. 74—337)

This invention relates to power transmission mechanism, and more particularly to an automatic variable speed transmission mechanism.

An object of the invention is to provide a variable speed transmission device in which the speed changes are made in accordance with the load requirements.

Another object of the invention is to provide an automatic multi-speed transmission mechanism in which the torque transmitted through the lower speed drive modifies the engagement of the higher speed drive.

Another object of the invention is to provide an automatic multi-speed transmission in which the engagement of the higher speed drive is controlled by two independent torque reaction members, one of which is associated with the driving shaft and the other is associated with an overrunning member constituting part of the lower speed drive.

Another object of the invention is to provide an automatic multi-speed transmission in which the over-running member of the second speed drive influences the engagement of the higher speed drive.

Another object of the invention is to provide a transmission mechanism having a friction clutch transmitting the power at one speed ratio which is entirely disengaged when the power is transmitted at a different speed ratio.

Another object of the invention is to provide a variable speed transmission for a vehicle in which the vehicle will normally start in a low gear ratio.

Another object of the invention is to provide a transmission mechanism in which the high speed drive is taken through a friction clutch upon which the engaging pressure is relieved when the load is increased beyond a predetermined value.

Another object of the invention is to provide a transmission mechanism with a friction clutch in which the coacting friction members are shifted bodily out of contact with a pressure member when the load is sufficient to require a lower gear ratio.

Another object of the invention is to provide an automatic variable speed transmission for a vehicle that will permit the vehicle to overrun the engine or free wheel.

Another object of the invention is to provide a variable speed transmission for a vehicle that in its normal position for forward movement will prevent backward movement of the vehicle.

Another object of the invention is to provide a transmission of the automatic variable speed type in which a reverse movement of the vehicle will simultaneously engage means for driving the vehicle at two different ratios and thereby lock the vehicle against backward movement.

Other objects and features of the invention will appear from the following description, in connection with which a preferred embodiment has been shown in the accompanying drawing, in which:

Fig. 1 is an axial sectional view through a transmission mechanism constructed according to the invention;

Fig. 2 is a transverse sectional view taken on the line 2—2 of Fig. 1; and,

Fig. 3 is a similar fragmental view taken on the line 3—3 of Fig. 1.

Referring to the drawing, 10 is the transmission casing in which is mounted a driving shaft 11 rotatable in a bearing 12. The inner end of driving shaft 11 is recessed at 13 for the reception of the end of a second driving shaft 14 which, if desired, may be made integral with 11 but in the present embodiment is separate therefrom and is operatively connected therewith by means of a coupling 16 having a toothed connection at 17 with a pinion 18 formed on the driving shaft 11 and a splined connection at 15 with shaft 14. A sleeve 19 is rotatably mounted upon shaft 14 by a bearing 21 which is connected to low speed gear 22 by means of an overrunning clutch having rollers 23 which are adapted to secure sleeve 19 in driving relation to gear 22 when the latter is rotated in a clockwise direction relative to sleeve 19, and which clutch permits sleeve 19 to overrun gear 22 when sleeve 19 is driven at a relatively faster speed than the gear. Sleeve 19 is provided with projecting teeth 24 which coact through balls 26 with a series of inwardly projecting teeth 27 secured to clutch housing 28. Within clutch housing 28 is a series of coacting friction members 29 and 31 which are alternately splined to the housing 28 and threaded nut 32 respectively.

Shaft 14 is provided with an exteriorly threaded portion 34 coacting with an interiorly threaded portion 36 of the nut 32 whereby normal rotation of the driving shaft 14 causes nut 32 to move toward the left, as viewed in Fig. 1, and cause the clutch pack, including the friction members 29 and 31, to move bodily toward the left, toward pressure member 37; flange 38 being provided on nut 32 which contacts clutch backing plate 39. The driven shaft 41 is piloted within the driving shaft 14 by bearing 42 and is also provided with an exteriorly threaded portion 43 which coacts with corresponding threads formed in pressure member 37 that is normally urged in the direction of the clutch pack by springs 44 coacting between the pressure member and plate 46. The pressure plate 37 is drivably connected to housing 28 by teeth 47 which coact with similar inwardly extending teeth 48 on the housing 28 through the intermediary of balls 49 for permitting relative movement of the pressure plate with respect to the housing 28 while the coacting teeth are transmitting the driving load.

The movement of the clutch pack toward the left, as viewed in Fig. 1, is limited by a stop nut 50, preferably threaded upon the shaft 14, whereby it may be adjusted to any desired position. A similar stop nut 51 is provided on the driven shaft 41 whereby movement of pressure plate 37 toward the clutch pack is arrested at the desired point, the arrangement of the stops 50 and 51 being such that if either pressure plate 37 or the clutch pack is moved to its full extent in a direction away from the corresponding member, the pressure plate 37 will not cause the friction members 29 and 31 to be forced into engagement, and no driving action will occur through the medium of the clutch friction members.

In the embodiment illustrated, a second driven shaft or vehicle propelling shaft 52 is used which is adapted to be connected to the vehicle driving wheels (not shown). In the normal forward driving position of the vehicle, driven shaft 52 is ordinarily connected to driven shaft 41, as shown in Fig. 1, by means of a slidable gear 53 having internal teeth 54 which mesh both with splines 55 formed on the shaft 52 and the teeth of member 56 splined to the driven shaft 41 at 57. Gear 53 is slidably mounted upon splines 55 and may be moved toward the left, as viewed in Fig. 1, by means of shift yoke 61 which is adapted to be moved by the operator by means of a control lever 62.

The first movement toward the left of gear 53 will cause teeth 54 to pass out of engagement with the teeth on member 56, and the transmission will be in its neutral position. A further movement of gear 53 toward the left will bring it into mesh with an idler gear 64 which is in constant mesh with gear 66 rotatably mounted upon countershaft 67. Gear 66 is preferably formed upon sleeve 68, upon which are formed gears 69 and 71, gear 69 being in constant mesh with gear 22 and gear 71 being in constant mesh with gear 18.

In the operation of the device, assuming that the engine or driving shaft 11 is turning in the direction of the arrow and the parts are in the position shown in the drawing, the drive will be transmitted from shaft 11 to shaft 14 by means of coupling 16, and shaft 14 will turn relative to nut 32 because of the slight inherent drag of the friction members 29 and 31. Nut 32, because of its threaded connection with shaft 14, will be moved toward the left toward pressure plate 37 until the nut contacts against the stop 50. In the meantime, as there has been insufficient pressure between friction members 29 and 31 to transmit the driving torque, the driven shaft 52 will receive movement from driving shaft 11 through pinion 18, gear 71, and gear 69 to gear 22, which will move in a clockwise direction relative to sleeve 19 and cause rollers 23 to connect the gear and sleeve into driving relation, whereupon sleeve 19 will transmit torque through teeth 24, balls 26, and teeth 27 to the clutch housing 28, which in turn will rotate pressure plate 37 in a clockwise direction and move it toward the left against the force of compression springs 44 by reason of the threaded connection of the plate with shaft 41. Pressure plate 37 is moved its maximum distance toward the left until it contacts with plate 46 which, as shown, is firmly held from rearward axial movement relative to shaft 41 by a split ring 58 secured in a groove in splines 57. By a proper selection of compression springs 44, this action occurs at a predetermined load on the driven shaft which necessitates the use of the lower gear ratio.

After the vehicle has been set in forward motion, and assuming that it is traveling upon level road, the torque reaction or load will be reduced somewhat and allow springs 44 to move pressure plate 37 toward the clutch pack which has been previously moved to its forward position by means of nut 32. At some point in its travel toward the clutch pack, projecting ring 78 will contact with the clutch pack and force the friction members thereof into frictional engagement and cause the drive from shaft 11 to be transmitted directly to shaft 41 through nut 32 and the friction members 29 and 31, which are alternately drivably connected with the clutch housing 28 and nut 32 respectively. After the friction members 29 and 31 are forced into driving engagement, sleeve 19 will be driven in a clockwise direction at a greater speed than gear 22, and rollers 23 will move to their inoperative position, as shown in Fig. 2, and permit an overrunning relation between the sleeve and gear.

If for any reason the torque load should increase to a point where it is necessary to use a lower gear ratio, pressure plate 37 will be forced out of contact with the clutch pack and gear 22 will assume the driving load.

If it is desired to reverse the direction of movement of the vehicle, gear 53 is moved to its extreme left position whereby driven shafts 52 and 41 are disconnected and the drive from the shaft 11 is shunted around the clutch by means of gear 71 to gear 66, idler gear 64, and gear 53 which has a splined connection with the shaft 52.

The transmission described above, when the parts are in the position for forward drive as illustrated in Fig. 1, acts as an automatic device to prevent undesired backward movement of the vehicle, if for any reason the engine should stall while the vehicle is traveling up grade. Under these conditions, sleeve 19 will attempt to move in a counter clockwise direction, as viewed in Fig. 2, by which movement the clutch pack is moved to its extreme left position by nut 32 against pressure plate 37, whereby the shafts 11 and 52 are connected together by means tending to drive them at two different speed ratios and results in locking of the parts.

If the torque load is reversed in direction, as in coasting or descending a hill, nut 32 will be moved toward the right out of contact with pressure plate 37, and under these conditions the vehicle will free wheel without any tendency of the driven shaft 52 to impart movement in the same direction to driving shaft 11.

While a preferred embodiment of the invention has been illustrated and described, it is understood that this showing and description are illustrative only and that the invention is not regarded as limited to the form shown and described, or otherwise, except by the terms of the following claims.

What is claimed is:

1. In a transmission mechanism, a driving shaft, a driven shaft, means connecting the shafts at two different speed ratios including a friction clutch having driving and driven members, a pressure plate for engaging the clutch members, resilient means for urging the pressure plate against the clutch members, and individual torque actuated means for urging the clutch members toward the pressure plate and the pressure plate toward the resilient means to overcome the same at a predetermined torque.

2. In a transmission mechanism, a driving shaft, a driven shaft, means connecting the shafts at two different speed ratios including a friction clutch having driving and driven members, a pressure plate for engaging the clutch members, resilient means for urging the pressure plate against the clutch members, and individual torque actuated means for urging the clutch members toward the pressure plate and the pressure plate toward the resilient means, said pressure plate being threaded on the driven shaft arranged to move out of contact with the clutch members at a predetermined torque load.

3. An automatic transmission comprising a driving shaft, a driven shaft, means for connecting the shafts at two different gear ratios, an overrunning clutch for the lower gear ratio, torque actuated means for engaging and disengaging the high gear including a normally disengaged friction clutch bodily movable toward an abutment mounted on one of said shafts for engaging the clutch, a stop for limiting bodily movement of the clutch, torque actuated means for moving the abutment relative to the clutch, and resilient means for moving the abutment toward the clutch.

4. An automatic transmission comprising a driving shaft, a driven shaft, means for connecting the shafts at two different gear ratios, an overrunning clutch for the lower gear ratio, torque actuated means for engaging and disengaging the high gear including a normally disengaged friction clutch bodily movable toward an abutment mounted on one of said shafts for engaging the clutch, a stop for limiting bodily movement of the clutch, torque actuated means for moving the abutment relative to the clutch, resilient means for moving the abutment toward the clutch, and means for limiting movement of the clutch toward the abutment whereby the abutment may move out of contact with the clutch at a predetermined torque.

5. In a transmission mechanism, a driving shaft, a driven shaft, means for connecting the shafts in one driving ratio including coacting driving and driven friction members constituting a clutch axially movable as a unit on one of said shafts, a pressure abutment mounted on one of said shafts having limited axial movement against which the clutch contacts in one axial position, independent means for axially moving the clutch members and abutment in the same direction by torque reaction, resilient means opposing movement of the abutment, and means for connecting the shafts in driving relation at a different speed ratio when the clutch is in a non-contacting relation with the abutment.

6. In a transmission mechanism, a driving shaft, a driven shaft, means for connecting the shafts in one driving ratio including coacting driving and driven friction members constituting a clutch axially movable as a unit on one of said shafts, a pressure abutment mounted on one of said shafts having limited axial movement against which the clutch contacts in one axial position, independent means for axially moving the clutch members and abutment in the same direction by torque reaction, resilient means opposing movement of the abutment, and means for connecting the shafts in driving relation at a different speed ratio when the clutch is in a non-contacting relation with the abutment, said last named connecting means including an overrunning clutch.

7. An automatic transmission comprising a driving shaft, a driven shaft, means for connecting the shafts at two different gear ratios, an overrunning clutch for the lower gear ratio, torque actuated means for engaging and disengaging the high gear including a normally disengaged friction clutch movable against an abutment mounted on one of said shafts for engaging the clutch, additional torque actuated means for moving the abutment relative to the clutch, resilient means for moving the abutment toward the clutch, and manually operable means for operatively disconnecting the driving shaft from the driven shaft.

8. An automatic transmission comprising a driving shaft, a driven shaft, means for connecting the shafts at two different gear ratios, an overrunning clutch for the lower gear ratio, torque actuated means for engaging and disengaging the high gear including a normally disengaged friction clutch movable against an abutment mounted on one of said shafts for engaging the clutch, additional torque actuated means including a nut threaded on the driven shaft for moving the abutment relative to the clutch, resilient means for moving the abutment toward the clutch, means for reversing the direction of the driven shaft including driving means operatively connecting the driving and driven shafts, and means for rendering the forward driving means inoperative when the reverse driving means is engaged.

9. A transmission device comprising a driving shaft, a driven shaft aligned therewith, each of said shafts having a threaded portion, means for directly coupling the shafts together including a normally disengaged friction clutch engaging the threaded portion of one shaft, a clutch pressure member engaging the threaded portion of the other shaft, said clutch and pressure member being adapted to be moved axially by torque reaction, resilient means urging the pressure plate toward the clutch, and means for connecting the shafts at a different ratio when the direct coupling means is disengaged.

10. A transmission device comprising a driving shaft, a driven shaft aligned therewith, each of said shafts having a threaded portion, means for directly coupling the shafts together including a normally disengaged friction clutch engaging the threaded portion of one shaft, a clutch pressure member engaging the threaded portion of the other shaft, said clutch and pressure member being adapted to be moved axially by torque reaction, resilient means urging the pressure plate toward the clutch, and means including an overrunning clutch for connecting the shafts at a different ratio when the direct coupling means is disengaged.

11. A transmission mechanism comprising a driving shaft, a driven shaft, connecting means having a positive connection with one shaft and a friction connection with the other shaft, said friction connection including a housing and coacting friction members having a slidable driving connection with the housing and one of said shafts, a pressure member operatively connected to the other shaft and adapted to force the friction members into contact, independent means for moving the friction members and pressure member in the same direction by torque reaction, spring means urging the pressure member toward the friction members, means preventing contact of the pressure member with the friction members when the torque reaction is sufficient to compress the spring means, and gear means including an overrunning clutch operatively connecting the driving shaft to the housing.

12. A transmission mechanism comprising a driving shaft, a driven shaft aligned therewith, connecting means concentric with both shafts having a positive connection with one shaft and a friction connection with the other shaft, said friction connection including a housing and coacting friction members having a slidable driving connection with the housing and one of said shafts, a pressure member operatively connected to the other shaft and adapted to force the friction members into contact, independent means for moving all of the friction members and pressure member in the same direction by torque reaction, spring means urging the pressure member toward the friction members, means preventing contact of the pressure member with the friction member when the torque reaction is sufficient to compress the spring means, and gear means including an overrunning clutch operatively connecting the driving shaft to the housing.

13. A transmission mechanism comprising a driving shaft, a nut threaded thereon, a driven shaft aligned therewith, a concentric clutch housing surrounding both shafts, coacting friction members engaging the housing and nut respectively, said friction members being movable within the housing by the nut in accordance with torque reaction, a pressure plate having a threaded engagement with the driven shaft and adapted to be moved thereon by torque reaction, said pressure plate having an operative connection with the housing and movable with respect thereto, spring means urging the pressure plate into contact with the friction members, means limiting the movement of both the pressure plate and the friction members toward a contacting position, said friction members and pressure plate being arranged to contact for drivably connecting the shafts for a predetermined torque reaction, and to be positively separated and render the friction members inoperative when the torque reaction is increased beyond the predetermined value, and gear means including an overrunning clutch operatively connecting the driving shaft to the housing.

14. An automatic transmission comprising a driving shaft, a driven shaft, means for connecting the shafts at two different gear ratios, an overrunning clutch for the lower gear ratio, torque actuated means for engaging and disengaging the high gear including a normally disengaged friction clutch bodily movable toward an abutment for engaging the clutch, a stop for limiting bodily movement of the clutch, means for holding the abutment in contact with the clutch, and means responsive to torque for moving the abutment out of contact with the clutch.

15. An automatic transmission comprising a driving shaft, a driven shaft; means for connecting the shafts at two different gear ratios, an overrunning clutch for the lower gear ratio, torque actuated means for engaging and disengaging the high gear including a normally disengaged friction clutch bodily movable toward an abutment for engaging the clutch, a stop for limiting bodily movement of the clutch, means for holding the abutment in contact with the clutch, means responsive to torque for moving the abutment out of contact with the clutch, and means including a manually operable device for connecting the driving and driven shafts around the clutch.

16. A transmission mechanism for a vehicle having a forward and a reverse drive, comprising a driving shaft, a driven shaft, a clutch for connecting the shafts in a high speed ratio, torque responsive means for engaging said clutch when the transmission is in forward drive and the load on the driven shaft opposing forward rotation is below a predetermined value, a gear train connecting the shafts in a lower gear ratio including an overrunning device permitting the driven shaft to overrun the gear train in a forward direction and preventing overrunning of the driven shaft in a reverse direction when the transmission is positioned for forward drive, a propeller shaft, and manually operable means for connecting the propeller shaft with the driven shaft in the forward drive and for disconnecting the driven shaft from the propeller shaft when the reverse drive is engaged.

17. A transmission mechanism for a vehicle having a forward and a reverse drive, comprising a driving shaft, a driven shaft, a clutch for connecting the shafts in a high speed ratio, torque responsive means for engaging said clutch when the transmission is in forward drive and the load on the driven shaft opposing forward rotation is below a predetermined value, a gear train connecting the shafts in a lower gear ratio including an overrunning device permitting the driven shaft to overrun the gear train in a forward direction and preventing overrunning of the driven shaft in a reverse direction when the transmission is positioned for forward drive, a propeller shaft, and a gear train for the reverse drive including a portion of the first mentioned gear train and a gear which is movable to connect the propeller shaft with the driven shaft in the forward drive and movable to disconnect the driven shaft from the propeller shaft prior to engagement of the movable gear with its mating gear of the reverse drive gear train.

RAYMOND P. LANSING.